(12) United States Patent
Wetzstein et al.

(10) Patent No.: US 12,345,344 B2
(45) Date of Patent: Jul. 1, 2025

(54) CONTROL VALVE

(71) Applicant: SAMSON Aktiengesellschaft, Frankfurt am Main (DE)

(72) Inventors: Nadine Wetzstein, Frankfurt am Main (DE); Thomas Koenig, Frankfurt am Main (DE)

(73) Assignee: SAMSON Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 18/575,285

(22) PCT Filed: Jul. 4, 2022

(86) PCT No.: PCT/EP2022/068467
§ 371 (c)(1),
(2) Date: Dec. 28, 2023

(87) PCT Pub. No.: WO2023/275408
PCT Pub. Date: Jan. 5, 2023

(65) Prior Publication Data
US 2024/0318738 A1  Sep. 26, 2024

(30) Foreign Application Priority Data

Jul. 2, 2021 (DE) ...................... 20 2021 103 581.1

(51) Int. Cl.
*F16K 25/00* (2006.01)
*F16K 3/24* (2006.01)

(52) U.S. Cl.
CPC ............ *F16K 25/005* (2013.01); *F16K 3/246* (2013.01)

(58) Field of Classification Search
CPC ............ F16K 25/005; F16K 1/42; F16K 3/246
See application file for complete search history.

(56) References Cited

U.S. PATENT DOCUMENTS

| 2,464,242 A | 3/1949 | Lane |
| 9,752,703 B2 * | 9/2017 | Kho .................... F16K 3/18 |

(Continued)

FOREIGN PATENT DOCUMENTS

| CN | 213271032 U | 5/2021 |
| DE | 1143528 A | 2/1963 |

(Continued)

OTHER PUBLICATIONS

PCT International Searching Authority, English translation of the PCT Written Opinion, issued for PCT/EP2022/068467 on Dec. 14, 2023, WIPO International Bureau, Geneva, Switzerland, 5 pages.

*Primary Examiner* — Michael R Reid
(74) *Attorney, Agent, or Firm* — Mei & Mark LLP; Manni Li

(57) ABSTRACT

A control valve (10) comprises a valve housing (12) with a valve inlet and valve outlet (12-1, 12-2) and a valve cover (14), also comprising a housing-mounted valve seat (16), which is arranged in the flow channel between the valve inlet and valve outlet (12-1, 12-2), further comprising a valve member (18), which is designed to complement the valve seat (16), and additionally comprising a drive rod (20), which is guided in a sealing manner through the housing cover (14) and via which the valve member (18) is connected to a drive (22) outside the housing, wherein the valve cover (14) comprises a sealing arrangement (24), by means of which the drive rod (20) is sealed in relation to the valve cover (14). The valve seat (16) and/or the valve member (18) are/is formed from an aerogel material or are/is coated with an aerogel coating.

16 Claims, 3 Drawing Sheets

(56) References Cited

U.S. PATENT DOCUMENTS

| | | |
|---|---|---|
| 2011/0079204 A1 | 4/2011 | Lades |
| 2015/0308303 A1 | 10/2015 | Lee et al. |
| 2020/0271230 A1 | 8/2020 | Sander et al. |

FOREIGN PATENT DOCUMENTS

| | | |
|---|---|---|
| DE | 102013211681 A1 | 12/2014 |
| DE | 102018214650 A1 | 3/2020 |
| WO | WO 2016/49252 A1 | 3/2016 |

* cited by examiner

CONTROL VALVE

CROSS-REFERENCE TO RELATED APPLICATIONS

The subject application is a U.S. national stage of PCT/EP2022/068467 filed on Jul. 4, 2022, which claims priority on German Patent Application No. 20 2021 103 581.1 filed on Jul. 2, 2021 in Germany. The contents and subject matter of the PCT international application are incorporated herein by reference.

TECHNICAL FIELD

The invention relates to a control valve of the type specified in the preamble of claim 1.

BACKGROUND OF INVENTION

Control valves are well known in the state of the art and usually have a valve housing with a valve inlet and a valve outlet as well as a valve cover that seals the valve housing. For controlling/regulating the flow of a process medium flowing through the control valve, a housing-mounted valve seat is arranged or formed in the flow channel of the valve housing, i.e. between the valve inlet and the valve outlet, which valve seat interacts with a valve member that can be moved in relation to the valve seat and that is designed to complement the valve seat. The valve seat is driven by a drive rod connected to the valve member, which drive rod is guided in a sealing manner through the housing cover and is operatively connected to a drive provided outside the housing, in particular a pneumatic drive.

It is also well known that, when valves are used under extreme boundary conditions, such as for process media of extremely high or extremely cold temperatures, thermal expansion, particularly of the valve seat and valve member components, can result in altered gap geometries that will adversely affect the internal tightness and also the rangeability of the valve. This is due to the fact that-because the spatial expansion of the valve member is small compared to the valve seat and valve housing components due to the valve design—the valve member, valve seat and valve housing components experience different thermally induced changes in length when heat is introduced or dissipated, which changes in length have an undesired effect on the valve's internal tightness behavior and also its rangeability. The same applies if different materials are used for the valve member, valve seat and valve housing components. Because different materials generally also have different thermal expansion behaviors, the adverse effects can be observed accordingly.

Another well-known problem occurring when control valves are used for process media of extreme temperatures is that the extreme temperatures of the process medium will also adversely affect the sealing and control behavior of the sealing arrangement installed in the housing cover, by means of which the drive rod is guided outwards to the drive in a sealing manner. In particular, a temperature-related increase in friction between the drive rod and the sealing arrangement must be taken into account, which may also result in jamming of the drive rod, so that the control of the valve is severely impaired or may no longer be possible.

In order to protect the sealing arrangement from extreme process media temperatures, it is known to provide the valve housing, i.e. the valve base body comprising the valve inlet and the valve outlet, with an extension body that extends the valve housing in an axial direction a towards the valve cover and acts as an insulating part, cf. DE 10 2019 104 589 A1. A disadvantage here is that the height of the valve structure is increased by the provision of the insulating part. Particularly for applications under cryogenic conditions, the operators of cold box systems are demanding ever smaller valve mounting angles to enable them to install a maximum number of control valves in a cold box. For this reason, the solution known from the art is no longer practicable.

A known solution for reducing thermal damage and/or an unfavorable thermal influence on components subjected to high thermal loads is to use materials having low thermal conductivity. This also includes aerogels, for example. Aerogels are highly porous solids with a volume that consists mainly of pores. An aerogel can be silicate-based or carbon-based, for example. Aerogels usually come in the form of a highly dendritic structure that includes particle chain branching units with a large number of interstices in the form of open pores. The particle chains have contact points which results in a configuration the form of a stable, sponge-like network. The pore size of the open pores can be in the nanometer range. Aerogels can either be used to coat components, or to manufacture complete components.

The use of aerogels in sensitive areas of valves to protect the latter from harmful thermal influences is known in the art:

For example, U.S. Pat. No. 2,464,242 A discloses a control valve having a valve housing that is extended by means of an insulating part. In order to reduce heat transfer via the drive rod, U.S. Pat. No. 2,464,242 A suggests a hollow design of the drive rod which is filled with an aerogel-based material.

US 2015/03083031 A1 discloses an injection valve for an internal combustion engine. In order to protect the valve member, which is exposed to high thermal loads, US 2015/0308303 A1 proposes providing parts of the valve member with an aerogel surface coating.

WO 2016/049252 A1 discloses a control valve exposed to high thermal stresses and a positioner flanged onto the control valve. For protecting the positioner flanged onto the control valve, WO 2016/049252 A1 proposes that the housing wall of the positioner adjacent to the thermally highly stressed control valve be formed in multiple layers, in particular that an aerogel-based insulating layer be sandwiched between two layers of other materials.

SUMMARY OF THE INVENTION

It is the object of the invention to further develop a control valve of the type specified in the preamble of claim 1 in such a way that trouble-free operation of the control valve is also possible when the latter is used under extreme boundary conditions, namely with process media of extremely high or extremely low temperatures. In particular, trouble-free operation of the control valve in terms of internal tightness and rangeability as well as perfect operation in terms of smooth actuation of the drive rod should be ensured.

The object of the invention, in a first aspect thereof, namely to enable trouble-free operation of the control valve with regard to internal tightness and rangeability, is accomplished by the characterizing features of claim 1 in conjunction with the features of its preamble.

Dependent claim 2 relates to an advantageous further development of the control valve of claim 1.

In a known manner, the control valve comprises a valve housing with a valve inlet and a valve outlet, as well as a valve cover that seals the valve housing. For controlling/ regulating the flow of a process medium through the control valve, the control valve further comprises, in a known manner, a housing-mounted valve seat which is arranged in the flow channel between the valve inlet and the valve outlet, a valve member designed to complement the valve seat, which valve member can be moved in relation to the valve seat, and a drive rod which is guided in a sealing manner through the housing cover and via which the valve member can be connected to a drive outside the housing, which valve cover comprises a sealing arrangement that seals the drive rod in relation to the valve cover.

The present invention now provides for the valve seat to be made of an aerogel material or to have an aerogel coating thereon, and/or for the valve member to be made of an aerogel material or to have an aerogel coating thereon. In particular, at least parts or at least essentially all of the valve seat and/or the valve member (respectively) is/are made completely from the aerogel material.

The design according to the invention has the effect that—with the thermal conductivity of the valve seat and valve member components now greatly reduced-heat input into and heat dissipation from the components is greatly reduced, and, as a result, thermally induced changes in length of the valve seat and valve member components are also greatly reduced. This advantageously ensures that there are no, or almost no, changes in length of the valve seat and valve member components, so that the designed geometric relationships between the valve seat and valve member are maintained over a larger thermal operating range. This means that the desired function or its characteristics remain unchanged, for example the respective IEC 60534-4 leakage classification or specified rangeability.

If the control valve is in the form of a cage valve, i.e. the control valve also comprises a housing-mounted valve cage that is arranged in the flow channel between the valve inlet and the valve outlet, an advantageous further development of the invention provides for the valve cage to also be made of an aerogel material or to also have an aerogel coating thereon. This advantageously ensures that even for a control valve formed as a cage valve, the designed geometric relationships will be maintained over a larger thermal application range. In particular, at least parts or at least essentially all of the valve cage is completely made of the aerogel material. Preferably, at least essentially all of the valve cage is completely provided with the aerogel coating. As an alternative, it is conceivable for the valve cage to be provided with the aerogel coating, in particular only in an area of contact with the valve seat and/or the valve housing, in particular to reduce heat transfer from the valve seat to the valve cage and/or to the valve housing.

The object of the invention, in a second aspect thereof, i.e. to enable trouble-free operation of the control valve as regards smooth operation of the drive rod, is accomplished by the characterizing features of claim 3 in conjunction with the features of the preamble of claim 1.

Dependent claims 4 to 9 relate to advantageous further developments of the control valve of claim 3.

For this purpose, the invention provides for the sealing arrangement arranged in the valve cover of the valve housing and sealing the drive rod with respect to the valve cover to have an associate insulating body which is formed from an aerogel material or is coated with an aerogel coating. Preferably, the insulating body is at least substantially completely coated with the aerogel coating. As an alternative, it is conceivable for the insulating body to only have the aerogel in areas facing the drive rod and/or the valve cover, in particular areas adjacent to these components.

The wording an insulating body arranged inside the valve housing and associated with the sealing arrangement is generally understood to mean a component which is arranged inside the valve housing and which is in direct or indirect contact with the sealing arrangement and is suitable for reducing heat input into the sealing arrangement or heat transfer out of the sealing arrangement.

The design according to the invention proves to be particularly advantageous, since it greatly reduces heat input into, or heat transfer out of, the sealing arrangement owing to the insulating body provided, which is made of an aerogel material or is provided with an aerogel coating. As a result, even critical temperatures of the sealing arrangement, which may lead to an increase in friction between the drive rod and the sealing arrangement or potentially even cause jamming of the drive rod in the sealing arrangement, are also avoided.

This design proves to be particularly advantageous when using cryogenic media as process media, i.e. in cryogenic applications, because the insulating body which is arranged inside the valve housing according to the invention and which is made of an aerogel material or is provided with an aerogel coating now makes it possible to dispense with the valve housing design previously common in the art, cf. DE 10 2019 104 589 A1, i.e. axially extending the valve housing by means of an extension body acting as an insulating part. This means that a higher number of valves can be installed in a cold box because the valve mounting angle is smaller now—as demanded by the operators of cold box systems.

In one embodiment of the invention, the insulating body is designed as a disk positioned below the sealing arrangement, as viewed in an axial direction a, and arranged in the valve cover. This advantageously makes for a particularly compact means of insulation of the sealing arrangement.

In another, particularly preferred embodiment of the invention, the insulating body is designed as a displacement body which, as viewed in axial direction a, is held axially clamped between the housing cover and another valve component permanently installed in the valve housing and which concentrically encloses the drive rod. Owing to the axial clamping between the valve cover and the other valve component, such as a circulation lock or a valve cage, this ensures a tight fit of the insulating body in a simple manner.

Preferably, the displacement body is essentially sleeve-shaped and is designed to completely fill the inner housing space between the drive rod and the adjacent inner wall of the valve housing, as viewed in a radial direction r. Since the sleeve-shaped displacement body now fills the entire inner housing space, particularly effective insulation of the sealing arrangement is ensured.

Another preferred embodiment of the invention provides for the drive rod passing through the sealing arrangement to be made of an aerogel material or to be provided with an aerogel coating, so that the drive rod itself forms the insulating body associated with the sealing arrangement. The advantage of this embodiment is that no additional components are required for the intended insulation of the sealing arrangement.

In order to also reduce heat input into, or heat transfer out of, the sealing arrangement via the valve cover, the valve cover itself is preferably also made of an aerogel material or provided with an aerogel coating.

Moreover, the valve member is preferably also made of an aerogel material or provided with an aerogel coating. This reliably prevents any heat transfer from the valve member to the sealing arrangement via the valve rod.

The subject matter of dependent 10 to 16, which will be discussed below, relates to advantageous further embodiments of the control valve of the invention according to claims 1 and 3.

In order to ensure a high sealing behavior with a small installation space requirement, the sealing arrangement provided in the valve cover is preferably designed as a stuffing box packing. Preferably, the drive rod is designed in two parts and comprises a valve rod connected to the valve member and an actuator rod that is firmly connected to the valve rod, passes through the housing cover in a sealing manner and can be operatively connected to a drive. However, a single-piece design of the drive rod is also conceivable, i.e. in which part of the drive rod is inside the housing, connected to the valve member, and part of the drive rod is outside the housing, i.e. guided out of the valve housing in a sealed manner and connectable to a drive.

Preferably, the aerogel material is a semi-metal oxide or metal oxide, such as the oxides silicon dioxide, titanium oxide or aluminum oxide, but carbon-based substances are also conceivable. As initial tests have shown, their heat conduction properties make these materials particularly advantageous with regard to the present field of application in a control valve.

The aerogel coating is preferably made of composites of the aforementioned materials with synthetic resins or polyamides, or also pure material.

Moreover, it is proposed that the valve seat be provided with the aerogel coating, in particular only in a contact area for a connection between the valve seat and the valve housing. Temperature-induced deformation of the valve seat and/or other temperature-induced effects on the valve seat in the contact area can thus be advantageously prevented. This is an advantageous way of ensuring easy installation and removal of the valve seat. Advantageously high modularity and advantageously simple maintenance of the control valve are thus made possible, in particular also for use of the valve in an environment and/or with media of relatively high or low temperatures. Preferably, the valve seat is separate from the valve housing. Preferably, the valve seat is designed to be removable or replaceable. In particular, the valve seat is non-positively and/or positively connected to the valve housing in an assembled state. It is conceivable for the valve seat to be screwed, clamped or braced to the valve housing in the assembled state. Preferably, the valve seat is at least partially in contact with the valve housing, in particular with an inner wall of the valve housing, via the contact area. In particular, the contact area of the valve seat extends over an outer surface of the valve seat, which comprises at least one contact surface of the valve seat on the valve housing. It is conceivable for the contact area or the outer surface of the valve seat to extend beyond the contact surface, preferably in order to prevent or reduce adverse temperature-related effects on the valve seat due to the proximity to an inner surface of the valve housing. Alternatively, it is conceivable for the valve seat and/or the valve member to be provided with the aerogel coating, in particular only in an area of a flow restrictor of the control valve. In particular, the area of the flow restrictor of the control valve comprises a sealing edge of the valve seat and/or the valve member, which is preferably provided to interact with the valve member or the valve seat when the control valve is closed.

The invention further proposes that at least essentially all of the valve seat and/or the valve member be completely coated with the aerogel coating. This advantageously achieves complete protection of the valve seat and/or the valve member against undesired temperature-related effects, such as thermal deformation, in particular when using high-temperature media. As a result, a high operation reliability and a long service life of the control valve can be advantageously achieved under these conditions. Preferably, the aerogel coating extends over an outer surface of the valve seat and/or the valve member. The wording that a body, in particular the valve seat and/or the valve member, is essentially completely coated, is in particular to be understood to mean that a coating, in particular the aerogel coating, extends over or covers at least 95%, preferably at least 98% and particularly preferably at least 99%, of an entire surface of the body. For example, it is conceivable for the valve member to be designed without a coating in an area facing the drive, in particular to enable a connection with another component of the control valve.

Additional advantages, features and possible applications of the present invention will be apparent from the description which follows, in which reference is made to the embodiments illustrated in the drawings.

BRIEF DESCRIPTION OF THE DRAWINGS

Throughout the description, the claims and the drawings, those terms and associated reference signs are used as are stated in the list of reference signs below. In the drawings.

DETAILED DESCRIPTION OF THE INVENTION

In the description which follows, and in the Figures, identical parts and components are designated with the same reference signs to avoid repetition, unless further differentiation is necessary or useful.

Figure 1:
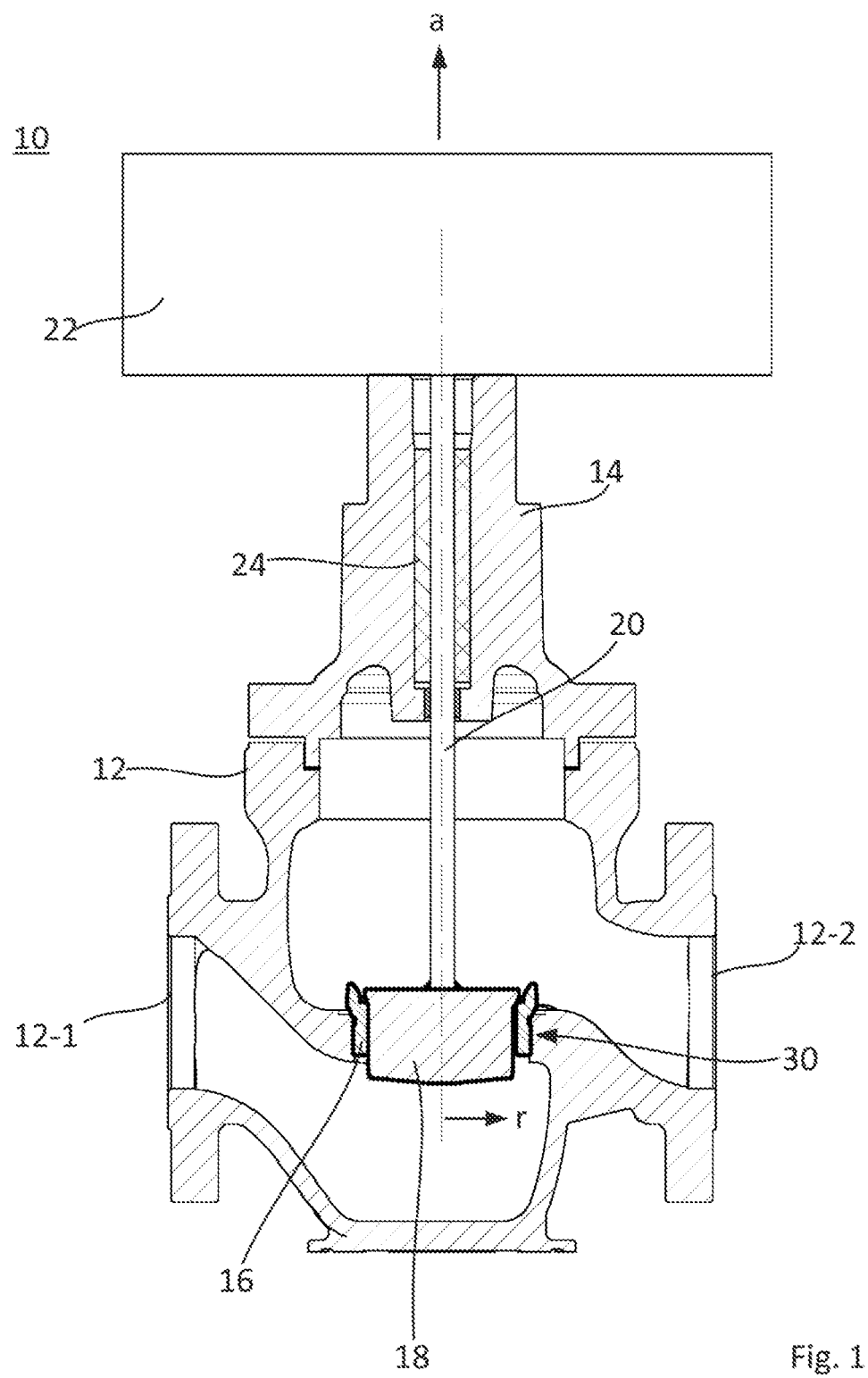
FIG. 1 is a sectional view of a control valve according to the invention.

FIG. 1 is a view of a control valve designated in its entirety by the reference numeral 10. In a known manner, the control valve 10 comprises a valve housing 12 with a valve inlet 12-1 and a valve outlet 12-2. The valve cover, which seals the valve housing 12 from the environment, is designated by the reference numeral 14.

To adjust the flow cross-section, in a known manner, the control valve 10 has a valve seat 16 arranged in the flow channel of the valve housing 12, i.e. between valve inlet 12-1 and valve outlet 12-2, as well as a valve member 18 designed to complement the valve seat 16 and movable in relation to the valve seat 16. As seen in FIG. 1, the valve seat 16 is designed as a separate component from the valve housing 12 that is detachably connected to the valve housing 12.

For valve member actuation, the valve member 18 is operatively connected via a drive rod 20 to a drive 22 arranged above the valve cover 14, as viewed in an axial direction a. As further seen in FIG. 1, a sealing arrangement 24 is arranged in the valve cover 14, which is used to seal the drive rod 20 with respect to the valve cover 14. In the present case, the sealing arrangement 24 is designed as a stuffing box packing.

The control valve 10 of FIG. 1 is characterized by the fact that the valve seat 16 and the valve member 18 are provided with an aerogel coating. In FIG. 1, the coating is indicated by the bolder lines around the components valve seat 16 and valve member 18. The aerogel coating has a highly insulating effect, with the result that even at extremely high or cold process media temperatures, there is virtually no heat input or heat transfer from process medium to the valve seat 16 and valve member 18 components. This advantageously ensures that there are no changes in length of the components valve seat 16 and valve member 18 either, so that the designed geometric relationships between valve seat 16 and valve member 18 are maintained. The valve seat 16 is formed separately from the valve housing 12. The valve seat 16 is connected to the valve housing 12 and is designed to be removable or replaceable. The valve member 18 and the valve seat 16 are each essentially completely provided with the aerogel coating. As an alternative, it is conceivable for the valve member 18 and/or the valve seat 16 to be coated individually or only partially each, for example for the valve seat 16 only in a contact area 30 for connection to the valve housing 12.

Figure 2:
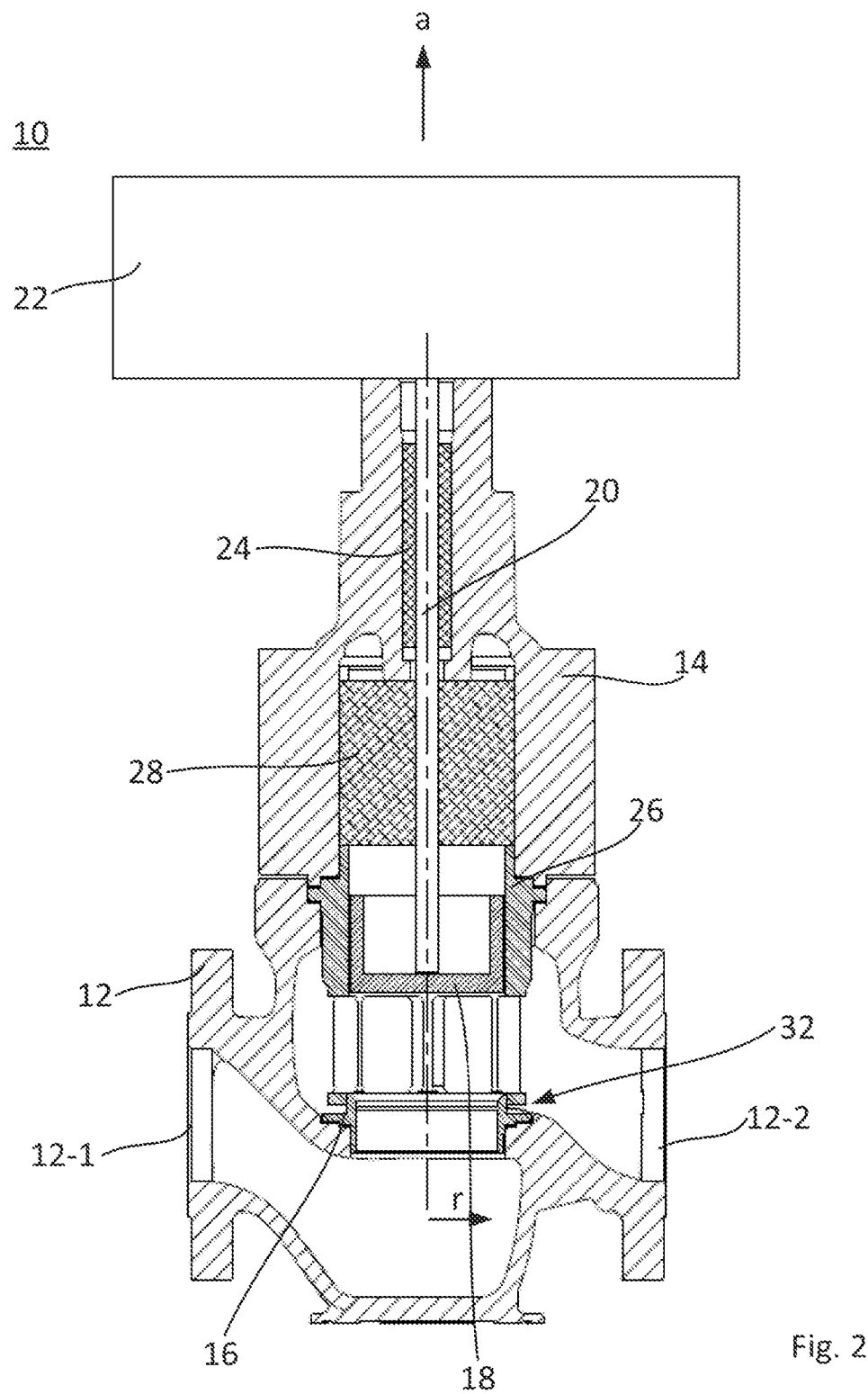
FIG. 2 is a sectional view of another embodiment of a control valve according to the invention.

The control valve shown in FIG. 2 is of essentially the same design. As seen in FIG. 2, the control valve 10 is designed as a so-called cage valve and has a housing-mounted valve cage 26 arranged in the flow channel between valve inlet 12-1 and valve outlet 12-2 in a known manner. It is conceivable for the valve cage 26 to be partially or essentially completely provided with an aerogel coating. For example, it is conceivable for the valve cage to be provided with the aerogel coating in only an area of contact with the valve seat 16 and/or the valve housing 12, in particular to reduce heat transfer from the valve seat 16 to the valve cage 26.

The control valve 10 of FIG. 2 is characterized by the fact that the sealing arrangement 24 has an associated insulating body made of an aerogel, designated in total by the reference numeral 28.

In the embodiment of FIG. 2, the insulating body 28 is sleeve-shaped and completely fills the inner housing space between the drive rod 20 and the inner wall of the valve housing 12, as viewed in a radial direction r, and is held clamped between the housing cover 14 and the valve cage 26, as viewed in an axial direction a.

Figure 3:
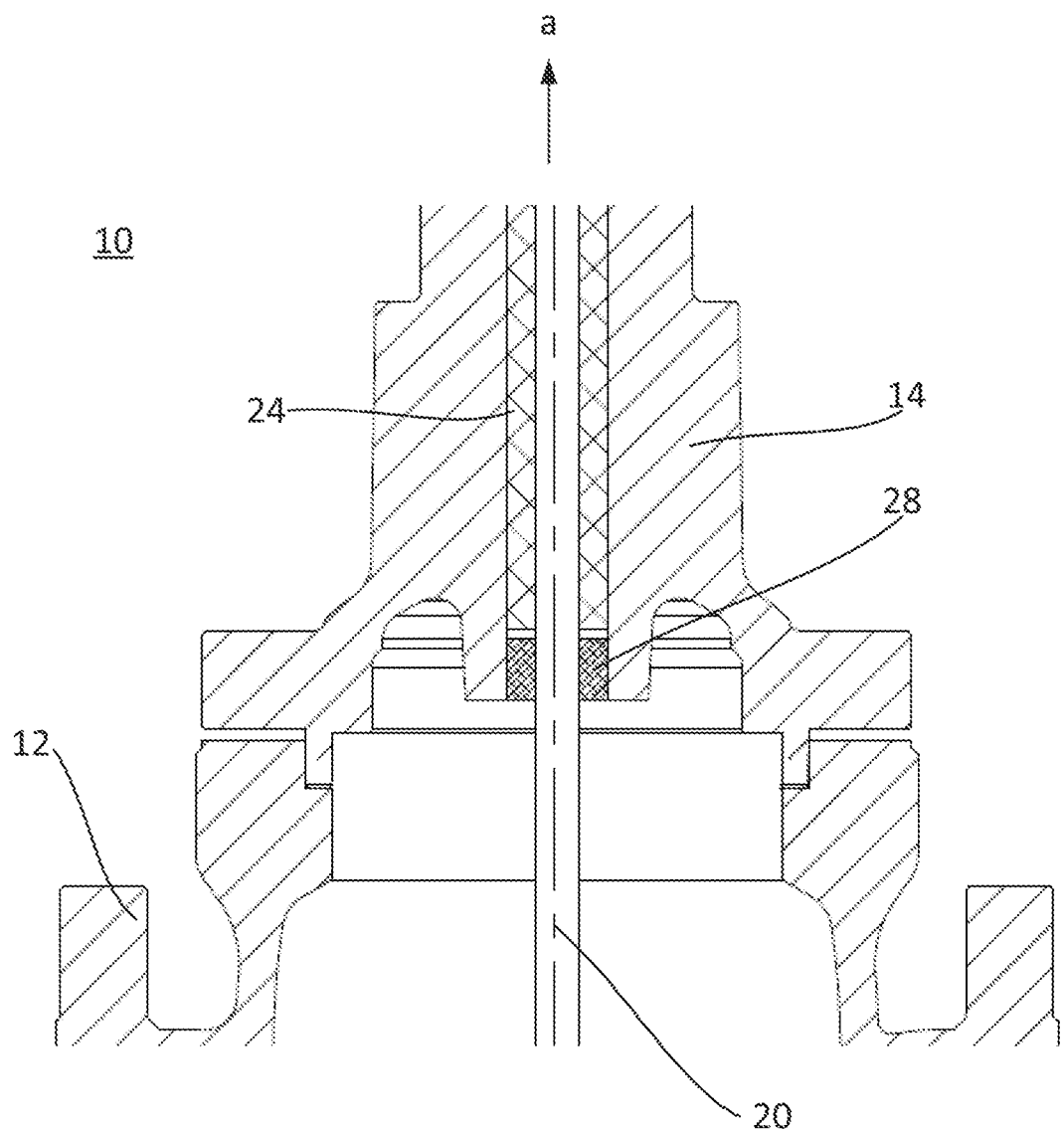
FIG. 3 is an enlarged detail of another embodiment of a control valve according to the invention.

The embodiment of the detail view of FIG. 3 is also characterized by the fact that the sealing arrangement 24 has an associated insulating body 28 made of an aerogel. As seen in FIG. 3, the insulating body 28 is designed as a disk positioned below the sealing arrangement, as viewed in an axial direction a, and arranged in the valve cover 14.

The provision of the insulating body 28 in accordance with the invention proves to be particularly advantageous, since the insulating effect of the insulating body 28 prevents harmful heat input into, or heat transfer out of, the sealing arrangement 24, thus avoiding critical temperatures in the area of the sealing arrangement 24 which would cause an increase in friction between the drive rod 20 and the sealing arrangement 24. As an alternative, it is conceivable for the valve cage 28 to be partially or essentially completely coated with an aerogel coating. For example, it is conceivable for the insulating body 28 to only have the aerogel coating in areas facing the drive rod 20 and/or the valve cover 14, in particular areas adjacent to these components.

| List of Reference Signs | |
|---|---|
| 10 | control valve |
| 12 | valve body |
| 12-1 | valve inlet |
| 12-2 | valve outlet |
| 14 | valve cover |

| List of Reference Signs (continued) | |
|---|---|
| 16 | valve seat |
| 18 | valve member |
| 20 | drive rod |
| 22 | drive |
| 24 | sealing arrangement |
| 26 | valve cage |
| 28 | insulating body |
| 30 | contact area |
| 32 | contact area |
| a | axial direction |
| r | radial direction |

The invention claimed is:

1. A control valve (10), comprising
a valve housing (12), wherein the valve housing (12) comprises a valve inlet and valve outlet (12-1, 12-2) and a valve cover (14),
a housing-mounted valve seat (16), wherein the housing-mounted valve seat (16) is arranged in a flow channel between the valve inlet and valve outlet (12-1, 12-2),
a valve member (18), wherein the valve member (1) is designed to complement the valve seat (16), and
a drive rod (20), wherein the drive rod (20) is guided in a sealing manner through the valve cover (14) and via which the valve member (18) can be connected to a drive (22) outside the housing via the drive rod (20),
wherein the valve cover (14) comprises a sealing arrangement (24), by means of which the drive rod (20) is sealed in relation to the valve cover (14), and
the valve seat (16) and/or the valve member (18) are/is formed from an aerogel material or are/is provided with an aerogel coating.

2. The control valve (10) according to claim 1, further comprising
a housing-mounted valve cage (26)
wherein the housing-mounted valve cage (26) is arranged in the flow channel between the valve inlet and the valve outlet (12-1, 12-2) and is made of an aerogel material or is provided with an aerogel coating.

3. The control valve (10) according to the preamble of claim 1, further comprising
an insulating body (26) arranged inside the valve housing (12) and associated with the sealing arrangement (24), wherein the insulating body (26) is formed from an aerogel material or is provided with an aerogel coating.

4. The control valve (10) according to claim 3, wherein the insulating body (26) is designed as a disk positioned below the sealing arrangement, as viewed in an axial direction (a), and arranged in the valve cover.

5. The control valve (10) according to claim 3, wherein the insulating body (26) is designed as a displacement body which concentrically encloses the drive rod (20) and which, as viewed in an axial direction (a), is held axially clamped between the valve cover (14) and an additional valve component (26) permanently installed in the valve housing (12).

6. The control valve (10) according to claim 5, wherein the displacement body is sleeve-shaped and completely fills the inner housing space, as viewed in a radial direction (r), between the drive rod (20) and the inner wall of the valve housing (12).

7. The control valve (10) according to claim 3, wherein the drive rod (20) passing through the sealing arrangement (24) is made of an aerogel material or is provided with an aerogel coating, so that the drive rod (20) itself forms the insulating body associated with the sealing arrangement (24).

8. The control valve (10) according to claim 7, wherein the housing cover (14) is made of an aerogel material or is provided with an aerogel coating.

9. The control valve (10) according to claim 7, wherein the valve member (18) is formed from an aerogel material or is provided with an aerogel coating.

10. The control valve (10) according to claim 1, wherein the sealing arrangement (24) is designed as stuffing box packing.

11. The control valve (10) according to claim 1, wherein the drive rod (60) is formed in one piece.

12. The control valve (10) according to claim 1, wherein the drive rod (20) is designed in two parts and comprises a valve rod connected to the valve member (18) and an actuator rod connected thereto, which actuator rod passes through the valve cover (14) in a sealing manner and is connectable to a drive (22).

13. The control valve (10) according to claim 1, wherein the aerogel material is a semi-metal oxide or a metal oxide or a carbon-based substance.

14. The control valve (10) according to claim 1, wherein the aerogel coating is semi-metal oxides, metal oxides or carbon-based substances in composite with synthetic resins or polyamides.

15. The control valve according to claim 1, wherein the valve seat (16) is provided with the aerogel coating, in particular only in a contact area (30) for connection of the valve seat (16) to the valve housing (12).

16. The control valve according to claim 1, wherein the valve seat (16) and/or the valve member (18) are/is at least essentially completely provided with the aerogel coating.

* * * * *